US012515346B2

(12) United States Patent
Han et al.

(10) Patent No.: US 12,515,346 B2
(45) Date of Patent: Jan. 6, 2026

(54) ROBOT AND CONTROL METHOD THEREFOR

(71) Applicant: Samsung Electronics Co., Ltd., Suwon-si (KR)

(72) Inventors: Heungwoo Han, Suwon-si (KR); Moogeun Song, Suwon-si (KR); Sangyun Lee, Suwon-si (KR); Yujung Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 266 days.

(21) Appl. No.: 18/188,104

(22) Filed: Mar. 22, 2023

(65) Prior Publication Data
US 2023/0219233 A1 Jul. 13, 2023

Related U.S. Application Data

(63) Continuation of application No. PCT/KR2021/000221, filed on Jan. 8, 2021.

(30) Foreign Application Priority Data

Dec. 11, 2020 (KR) ........................ 10-2020-0172983

(51) Int. Cl.
B25J 11/00 (2006.01)
B25J 9/16 (2006.01)
B25J 13/00 (2006.01)

(52) U.S. Cl.
CPC ........... B25J 11/0005 (2013.01); B25J 9/161 (2013.01); B25J 9/1679 (2013.01); B25J 9/1697 (2013.01); B25J 13/003 (2013.01)

(58) Field of Classification Search
CPC ...... B25J 11/0005; B25J 9/161; B25J 9/1679; B25J 9/1697; B25J 13/003; G06Q 30/015; G06Q 90/20
See application file for complete search history.

(56) References Cited

U.S. PATENT DOCUMENTS 7,769,203 B2   8/2010   Oohashi et al.
8,818,556 B2   8/2014   Sanchez et al.
(Continued)

FOREIGN PATENT DOCUMENTS

JP   2006-192563 A   7/2006
JP   2009-248193 A   10/2009
(Continued)

OTHER PUBLICATIONS

International Search Report dated Aug. 25, 2021, issued in International Patent Application No. PCT/KR2021/000221.
(Continued)

Primary Examiner — Jason Holloway
Assistant Examiner — Elizabeth Rose Neleski
(74) Attorney, Agent, or Firm — Jefferson IP Law, LLP

(57) ABSTRACT

A robot is provided. The robot includes a camera, a depth sensor, a memory, and a processor configured to perform an interaction with a first user with a highest degree of interest from among a plurality of users present in vicinity of the robot, obtain gazing information of the plurality of users while performing the interaction with the first user, and obtain distance information of the plurality of users, determine an engagement level of the first user for the interaction by using gazing information and distance information of the first user from among the plurality of users, determine a degree of interest of another user by using gazing information and distance information of the first user and the another user from among the plurality of users, end the interaction with first user, and perform an interaction with the another user based on the degree of interest of the another user.

23 Claims, 9 Drawing Sheets

(56) References Cited

U.S. PATENT DOCUMENTS

| | | |
|---|---|---|
| 9,682,482 B2 | 6/2017 | Ohara |
| 9,796,093 B2 | 10/2017 | Mascorro Medina et al. |
| 11,285,611 B2 | 3/2022 | Park et al. |
| 11,411,902 B2 | 8/2022 | Shingu |
| 2009/0148034 A1 | 6/2009 | Higaki et al. |
| 2012/0185090 A1 | 7/2012 | Sanchez et al. |
| 2014/0218516 A1 | 8/2014 | Kim et al. |
| 2016/0299505 A1* | 10/2016 | Ohara .................. B25J 11/0005 |
| 2020/0089252 A1 | 3/2020 | Kim et al. |
| 2020/0122333 A1* | 4/2020 | Park ....................... B25J 13/086 |

FOREIGN PATENT DOCUMENTS

| | | |
|---|---|---|
| JP | 4505862 B2 | 7/2010 |
| JP | 2016/198850 A | 12/2016 |
| JP | 2018-051669 A | 4/2018 |
| JP | 6402219 B1 | 10/2018 |
| JP | 6497185 B2 | 4/2019 |
| JP | 2019-101768 A | 6/2019 |
| JP | 2022-057507 A | 4/2022 |
| KR | 10-1295003 B1 | 8/2013 |
| KR | 10-2017-0097017 A | 8/2017 |
| KR | 10-1984320 B1 | 5/2019 |
| KR | 10-2019-0083727 A | 7/2019 |
| KR | 10-1993243 B1 | 9/2019 |
| KR | 10-2020-0046186 A | 5/2020 |

OTHER PUBLICATIONS

Korean Office Action dated Jun. 2, 2025, issued in Korean Application No. 10-2020-0172983.

* cited by examiner

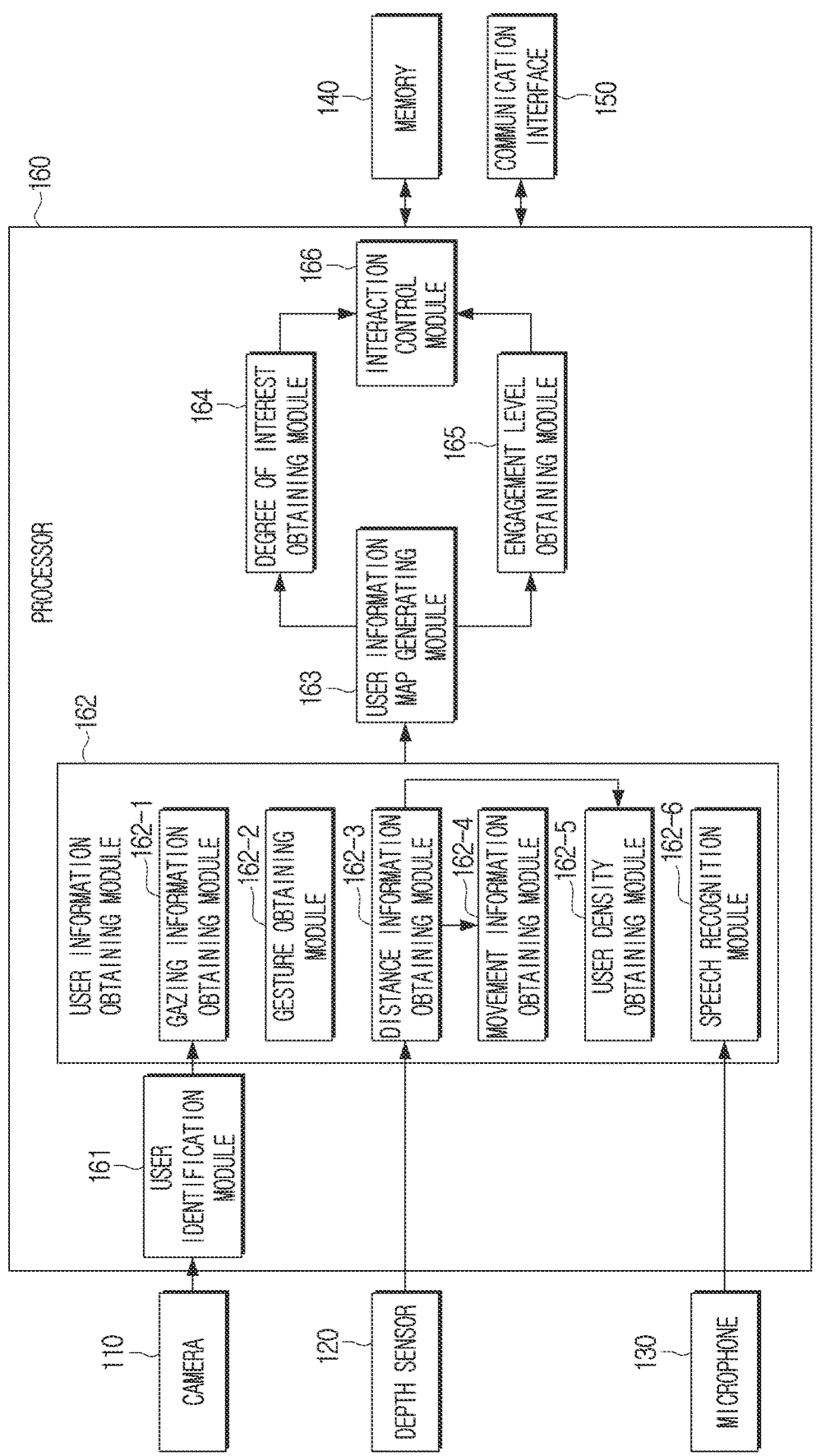

FIG. 4

| movement / gazing | LEAVE | STOP | COME |
|---|---|---|---|
| LOOK-NO | 1 | 1 | 2 |
| LOOK-OK | 1 | 2 | 3 |

| distance gazing | d ≤ 1.3m | 1.3m < d ≤ 2.5m | 2.5m < d ≤ 3.5m | 3.5m < d |
|---|---|---|---|---|
| LOOK-NO | 5 | 3 | 2 | 1 |
| LOOK-OK | 5 | 4 | 2 | 1 |

61

ROBOT AND CONTROL METHOD THEREFOR

CROSS-REFERENCE TO RELATED APPLICATION(S)

This application is a continuation application, claiming priority under § 365(c), of an International application No. PCT/KR2021/000221, filed on Jan. 8, 2021, which is based on and claims the benefit of a Korean patent application number 10-2020-0172983, filed on Dec. 11, 2020, in the Korean Intellectual Property Office, the disclosure of which is incorporated by reference herein in its entirety.

BACKGROUND

1. Field

The disclosure relates to a robot and a control method therefor. More particularly, the disclosure relates to a robot that collects and stores information on users who are in vicinity of the robot even while performing an interaction, and performs the interaction based on information on the users, and a control method therefor.

2. Description of Related Art

With developments in electronic technology, robots that perform interaction with users in real life are being actively used. As an example, a service robot guides users with route directions within a specific space such as an airport or a museum, or provides users with information on a corresponding space.

If a robot is to perform an interaction with a user, a process of identifying an interaction target is first necessary. A robot of related art calculated, based on a plurality of users being present in vicinity of the robot, scores based on a position, a distance, or the like of respective users, respectively, and selected a user with a highest score as the interaction target from among the plurality of users. However, the robot of the related art did take into consideration information on user density when calculating scores for the plurality of users. For example, even if many users are concentrated forming a crowd, if a specific user who is not included in the corresponding crowd is positioned closely with the robot, the robot selected the corresponding user as the interaction target and more people were not simultaneously provided with service. Accordingly, there is a problem of service usefulness decreasing.

In addition, the robot of the related art did not collect information on other users present in vicinity of the robot while performing an interaction with the interaction target. Accordingly, because the robot of the related art moved to an initial position when the interaction with the interaction target is completed, other users positioned in vicinity of the interaction target that desired to receive service from the robot were inconvenienced in having to move to the initial position of the robot.

Accordingly, there is a growing need for a robot that can further increase service usefulness and improve user convenience, and a control method therefor.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a robot that collects information on a user and performs a more natural interaction with the user.

Additional aspects will be set forth in part in the description which follows and, in part, will be apparent from the description, or may be learned by practice of the presented embodiments.

In accordance with an aspect of the disclosure, a robot is provided. The robot includes a camera, a depth sensor, a memory, and a processor, and the processor is configured to perform an interaction with a first user with a highest degree of interest from among a plurality of users present in vicinity of the robot by using the camera and the depth sensor, obtain gazing information of the plurality of users by using the camera while performing the interaction with the first user, obtain distance information of the plurality of users by using the depth sensor, and obtain distance information of the plurality of users, determine an engagement level of the first user for the interaction by using gazing information and distance information of the first user from among the plurality of users, determine a degree of interest of another user by using gazing information and distance information of the first user and the another user from among the plurality of users, end, based on the engagement level of the first user being less than a threshold value, the interaction with first user, and perform an interaction with the another user based on the degree of interest of the another user.

The processor may be configured to store, while performing the interaction with the first user, a first map including gazing information of the plurality of users, respectively, and a second map including distance information of the respective users in the memory, generate a fusion map by fusing the first map and the second map, store the fusion map in the memory, and perform an interaction with the another user based on the fusion map.

The processor may be configured to accumulate the fusion map for each of respective times and store in the memory, and delete the first map and the second map from the memory according to time.

The processor may be configured to obtain an image including the plurality of users by using the camera, obtain gazing information of the plurality of users by analyzing the image, obtain distance information of the plurality of users by using the depth sensor, obtain density information of the plurality of users based on the distance information of the plurality of users, calculate a degree of interest of the plurality of users, respectively, based on the gazing information, the density information, and the distance information of the plurality of users, and identify the first user with the highest degree of interest from among the plurality of users based on the degree of interest of the respective users.

The density information may include density weight values that corresponds to the respective users, and the processor may be configured to calculate a first density weight value that corresponds to the first user based on at least one from among a distance between the first user and the another user and a number of other users included within a pre-set range from the first user, and calculate the degree of interest of the first user based on the first density weight value.

The processor may be configured to calculate a high degree of interest of the first user as the first density weight value is greater.

The processor may be configured to obtain time information that corresponds to the degree of interest of the respective users and store in the memory, and identify, based on the time information, another user with a degree of interest of greater than or equal to a threshold value within a pre-set range from a time point at which the interaction with the first user is ended as an interaction target.

The electronic device may further include a microphone, and the processor may be configured to obtain a speech signal by using the microphone, identify a user corresponding to the speech signal from among the plurality of users, and calculate the degree of interest of the identified user based on the speech signal.

In accordance with another aspect of the disclosure, a control method of a robot is provided. The control method includes obtaining a degree of interest of a plurality of users, respectively, that are present in vicinity of the robot by using a camera and a depth sensor included in the robot, performing an interaction with a first user with a highest degree of interest from among the plurality of users based on the obtained degree of interest, obtaining gazing information of the plurality of users by using the camera while performing the interaction with the first user, and obtaining distance information of the plurality of users by using the depth sensor, determining an engagement level of the first user for the interaction by using gazing information and distance information of the first user from among the plurality of users, and determining a degree of interest of another user by using gazing information and distance information of the first user and the another user from among the plurality of users, and ending, based on the engagement level of the first user being less than a threshold value, the interaction with first user, and performing an interaction with the another user based on the degree of interest of the another user.

The technical solutions of the disclosure are not limited to the above-described technical solutions, and the technical solutions will be understood clearly to those of ordinary skill in the art from the disclosure and the accompanied drawings unless otherwise specified.

According to the various embodiments of the disclosure as described above, a robot may perform a more natural interaction with a user based on information on the user. Accordingly, user convenience and satisfaction may be improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a block diagram illustrating a configuration of a robot according to an embodiment of the disclosure;

FIG. 4 is a table illustrating a degree of interest of a user according to an embodiment of the disclosure;

FIG. 6 is a table illustrating an engagement level of a user according to an embodiment of the disclosure.

Throughout the drawings, it should be noted that like reference numbers are used to depict the same or similar elements, features, and structures.

DETAILED DESCRIPTION

Figure 1:
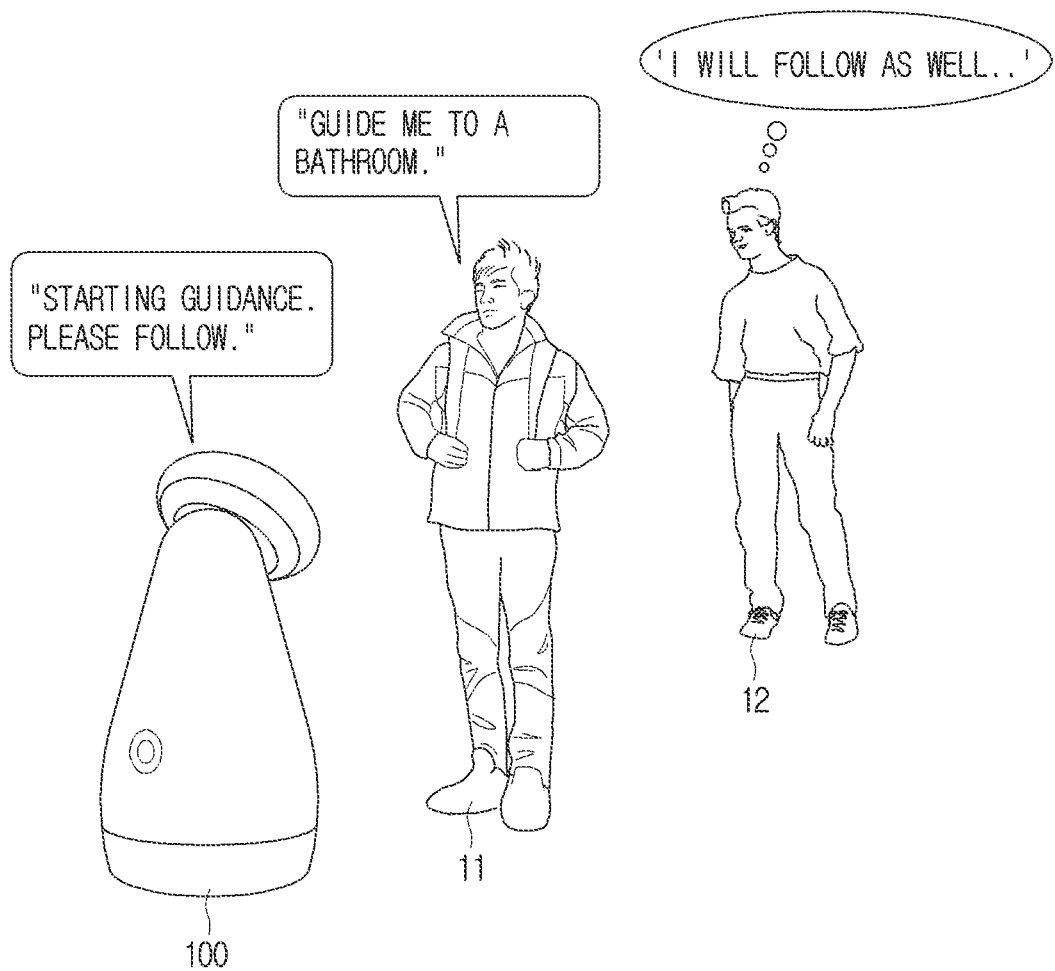
FIG. 1 is a diagram illustrating an operation of a robot according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various modifications may be made to the embodiments of the disclosure, and there may be various types of embodiments. Accordingly, specific embodiments will be illustrated in drawings and described in detail in the detailed description. However, it should be noted that the various embodiments are not for limiting the scope of the disclosure to a specific embodiment of the disclosure, but they should be interpreted to include all modifications, equivalents or alternatives of the embodiments included in the ideas and the technical scopes disclosed herein. In case it is determined that in describing the embodiments of the disclosure, detailed description of related known technologies may unnecessarily confuse the gist of the disclosure, the detailed description will be omitted.

Terms such as "first," and "second" may be used in describing the various elements, but the elements are not to be limited by the terms. The terms may be used only to distinguish one element from another.

A singular expression includes a plural expression, unless otherwise specified. It is to be understood that the terms such as "consist" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

Embodiments of the disclosure will be described in detail with reference to the accompanying drawings to aid in the understanding of those of ordinary skill in the art. However, the disclosure may be realized in various different forms and it should be noted that the disclosure is not limited to the various example embodiments described herein. Further, in the drawings, parts not relevant to the description may be omitted, and like reference numerals may be used to indicate like elements throughout the disclosure.

FIG. 1 is a diagram illustrating an operation of a robot according to an embodiment of the disclosure.

Referring to FIG. 1, a robot 100 may obtain a speech command (i.e., "Guide me to a bathroom") of a first user 11 who is present in vicinity of the robot. The robot 100 may perform an interaction with the first user 11 based on the obtained speech command. For example, the robot 100 may provide speech feedback (i.e., "Starting guidance. Please follow.") based on the obtained speech command. Then, the robot 100 may guide the first user 11 while traveling toward the bathroom. In this situation, a second user 12 who has an interest in the robot 100 may be present in vicinity of the robot 100. The second user 12 may follow the robot 100 desiring to receive a service (i.e., a route guidance service) that the robot 100 is providing to the first user 11.

The robot 100 may continuously obtain information on the second user 12 while performing the interaction with the first user 11. For example, the robot 100 may obtain at least one from among gazing information of the second user 12 for each pre-set time interval, distance information between the robot 100 and the second user 12, and movement information of the second user 12. In addition, the robot 100 may obtain a degree of interest for the robot 100 of the second user 12 for each of the respective time intervals based on information on the second user 12. Then, the robot 100 may match the information on the second user 12 and the degree of interest for each time interval with time information and store the matched information.

While the robot 100 is performing the interaction with the first user 11, a situation in which the first user 11 disappears outside a pre-set range from the robot 100 may arise. At this time, the robot 100 may end the interaction with the first user 11, and perform an interaction with the second user 12 based on the stored information on the second user 12. For example, the robot 100 may identify that the degree of interest of the second user 12 while the robot is performing the interaction with the first user 11 is greater than a pre-set value, and provide the service provided to the first user 11. That is, the robot 100 may guide the second user 12 while continuing to travel toward the bathroom. Alternatively, the robot 100 may provide a guide speech (e.g., "May I guide you to the bathroom?") to the second user 12.

Because a service robot of the related art does not collect and pre-store information on the second user 12 in the above-described situation, the interaction with the first user 11 is ended and the robot is moved to an initial position. Accordingly, the second user 12 experienced the inconvenience of having to request service to the service robot by going back to the initial position. Alternatively, the service robot of the related art provided an initial guide speech (e.g., "What can I help you with?) to the second user 12. Even in this case, the second user 12 experienced inconvenience because a request for service (i.e., bathroom guidance) had to be made to the service robot.

In contrast, because the robot 100 according to the disclosure obtains and stores information on the second user 12 even while performing an interaction with the first user 11, a more convenient service may be provided to the second user 12 based on the stored information. Accordingly, convenience and satisfaction of the second user 12 may be improved.

FIG. 2 is a block diagram illustrating a configuration of a robot according to an embodiment of the disclosure.

Referring to FIG. 2, the robot 100 may include a camera 110, a depth sensor 120, a microphone 130, a memory 140, a communication interface 150, and a processor 160.

The camera 110 may be a configuration for obtaining an image that captured the vicinity of the robot 100. The camera 110 may be disposed to capture a front direction of the robot 100. The camera 110 may include various image sensors. In an example, at least one from among a complementary metal oxide semiconductor (CMOS) image sensor and a charge coupled device (CCD) image sensor may be included.

The depth sensor 120 may be a configuration for obtaining distance information on an object (or user) present at the vicinity of the robot 100. Here, the distance information on the object (or user) may refer to a distance from the robot 100 to the object. In an example, the depth sensor 120 may be a light detection and ranging (LiDAR) sensor or a time of flight (ToF) sensor. At this time, the depth sensor 120 may scan the vicinity of the robot 100 360 degrees by using a laser.

The microphone 130 may be a configuration for obtaining a speech signal, and may obtain a speech signal of the user. In an example, the processor 160 may obtain a speech command of the user by analyzing the speech signal of the user that is input through the microphone 130.

The memory 140 may store an operating system (OS) for controlling the overall operation of elements of the robot 100 and instructions or data associated with the elements of the robot 100. In an example, the memory 140 may store information associated with a virtual environment and a virtual robot. The memory 140 may be implemented as a non-volatile memory (e.g., a hard disk, a solid state drive (SSD), a flash memory), a volatile memory, and the like.

The communication interface 150 may include at least one circuitry and perform communication with external devices of various types. For example, the communication interface 150 may perform communication with an external server or a user terminal. In addition, the communication interface 150 may perform communication with an external device according to communication methods of various types. The communication interface 150 may perform data communication via wireless or wired means. When performing communication with an external device in the wireless communication method, the communication interface 150 may include at least one from among a Wi-Fi communication module, a cellular communication module, a $3^{rd}$ generation (3G) mobile communication module, a $4^{th}$ generation (4G) mobile communication module, a 4G long term evolution (LTE) communication module, and a $5^{th}$ generation (5G) mobile communication module.

The processor 160 may control the overall operation of the robot 100. The processor 160 may include a user identification module 161, a user information obtaining module 162, a user information map generating module 163, a degree of interest obtaining module 164, an engagement level obtaining module 165, and an interaction control module 166.

The user identification module 161 may identify at least one user included in a captured image by analyzing the captured image that is obtained through the camera 110. In an example, the user identification module 161 may identify a user using an object recognition model stored in the memory 140.

When a user is identified through the user identification module 161, the user information obtaining module 162 may obtain various information associated with the identified user. The user information obtaining module 162 may include a gazing information obtaining module 162-1, a gesture obtaining module 162-2, a distance information obtaining module 162-3, a movement information obtaining module 162-4, a user density obtaining module 162-5, and a speech recognition module 162-6.

The gazing information obtaining module 162-1 may obtain gazing information of the user. In an example, the gazing information obtaining module 162-1 may obtain a gazing direction of the user. In addition, the gazing information obtaining module 162-1 may obtain an angle at which the user gazes at the robot 100. At this time, the gazing information obtaining module 162-1 may obtain the angle at which the user gazes at the robot 100 based on direction information of a body and head of the user.

The gesture obtaining module 162-2 may obtain gesture information of the user by analyzing the captured image. In an example, the gesture obtaining module 162-2 may obtain a gesture of the user for calling the robot 100.

The distance information obtaining module 162-3 may obtain distance information on the user based on a sensing value of the depth sensor 120. The distance information obtaining module 162-3 may obtain distance information for each of the respective positions within a scan range of the depth sensor 120. If the depth sensor 120 performs scanning for each pre-set time interval, the distance information obtaining module 162-3 may obtain the distance information on the user that corresponds to the respective time intervals.

The movement information obtaining module 162-4 may obtain movement information of the user. In an example, the movement information obtaining module 162-4 may identify whether the user is approaching toward the robot 100 or moving away from the robot 100. The movement information obtaining module 162-4 may obtain a change in distance information on the user based on the distance information on the user for each of the respective time intervals obtained through the distance information obtaining module 162-3. Then, the movement information obtaining module 162-4 may obtain the movement information of the user based on the change in distance information on the user. The movement information obtaining module 162-4 may obtain the movement information of the user by using an object tracking algorithm stored in the memory 140.

The user density obtaining module 162-5 may obtain information on user density. Here, the information on user density may refer to a degree of gathering between a plurality of users. If the plurality of users are included in the captured image, the user density obtaining module 162-5 may obtain distances between the plurality of users based on the distance information on the respective users. Then, the user density obtaining module 162-5 may obtain a user density based on the distance between the plurality of users. In an example, if the first user and the second user are included in the captured image, the user density obtaining module 162-5 may obtain first distance information on the first user and second distance information on the second user. Then, the user density obtaining module 162-5 may obtain a distance between the first user and the second user based on the first distance information and the second distance information. The user density obtaining module 162-5 may obtain the user density based on the distance between the first user and the second user. In an example, the user density may increase as the distance between the first user and the second user decreases.

The information on user density may include density weight values that correspond to each of the respective users. The user density obtaining module 162-5 may calculate the density weight values based on a number of other users that are included within a pre-set range based on the respective user. In an example, the user density obtaining module 162-5 may calculate the density weight value for the first user based on the number of other users that are included within the pre-set range based on the first user. At this time, the density weight value for the first user may increase as the number of other users that are included within the pre-set range based on the first user increases. In addition, the user density obtaining module 162-5 may calculate the density weight value for a specific user based on a distance between the specific user and another user. In an example, the density weight value for the first user may increase as the distance between the first user and another user decreases.

The speech recognition module 162-6 may obtain a speech command of the user based on a speech signal that is obtained through the microphone 130. For example, the speech recognition module 162-6 may obtain the speech command of the user requesting guidance to a specific location (i.e., meeting room) based on the speech signal ("Guide me to the meeting room."). The speech recognition module 162-6 may include an automatic speech recognition (ASR) module, a natural language understanding (NLU) module, a dialogue management (DM) module, a natural language generation module, and a text-to-speech (TTS) module.

The various information obtained through the above-described user information obtaining module 162 may be stored in the memory 140 in a 2-dimensional map form, respectively. To this end, the user information map generating module 163 may generate a map that corresponds to each of the respective user information. In an example, the user information map generating module 163 may generate a first map which includes the gazing information of the user obtained through the gazing information obtaining module 162-1. In addition, the user information map generating module 163 may generate a second map which includes the distance information on the user obtained through the distance information obtaining module 162-3.

The user information map generating module 163 may perform an operation of moving a position (or coordinates) of user information such that the user information included in the map is represented based on the robot 100. In an example, the user information map generating module 163 may move coordinates of the gazing information of the user based on position information of the camera 110. Accordingly, maps that include the respective user information may be represented based on the robot 100.

The user information map generating module 163 may generate a fusion map based on maps that correspond to the respective user information. The user information map generating module 163 may generate a fusion map by fusing the user information included in the respective maps. Accordingly, the fusion map may include various user information that are matched with one another. In an example, first gazing information may be included in a first position of the first map, and second distance information may be included in a second position of the second map. At this time, the user information map generating module 163 may fuse the first map and the second map, and generate a fusion map that includes the first gazing information and the second distance information. Specifically, if the first position corresponds with the second position, the user information map generating module 163 may match the first gazing information and the second gazing information and store in the fusion map. The fusion map generated as described above may be stored in the memory 140.

User maps may be periodically updated, respectively. In an example, the user information map generating module 163 may generate a first gazing information map that includes the first gazing information obtained during a first time interval and store in the memory 140. Then, the user information map generating module 163 may generate a second gazing information map that includes the second gazing information obtained during a second time interval which is a time interval following the first time interval. At this time, the user information map generating module 163 may store the second gazing information map in the memory 140 and delete the first gazing information map stored in the memory 140. Accordingly, the robot 100 may effectively manage the memory 140.

On the other hand, the fusion maps that are obtained for each of the respective time intervals may be accumulated and stored in the memory 140. In an example, the user information map generating module 163 may accumulate a first fusion map that corresponds to the first time interval and a second fusion map that corresponds to the second time interval and store in the memory 140. As described above, if the fusion map is accumulated and stored in the memory 140, the robot 100 may perform a more natural interaction with the user by using the fusion map that corresponds to not only a current time interval, but also past time intervals. In addition, the fusion map may be generated even when the robot 100 is performing an interaction with the user and stored in the memory 140.

The degree of interest obtaining module 164 may obtain the degree of interest of the user for the robot 100 based on the user information included in a user information map. In an example, the degree of interest obtaining module 164 may obtain the degree of interest of the user based on the gazing information of the user. For example, if the first user is present outside a first threshold distance (e.g., 2.5 m) from the robot 100, the degree of interest obtaining module 164 may obtain the degree of interest of the first user as a first rating.

In another example, the degree of interest obtaining module 164 may obtain the degree of interest based on the gazing information of the user and the distance information on the user. For example, if the second user who is present within the first threshold distance from the robot 100 does not gaze at the robot 100, the degree of interest obtaining module 164 may obtain the degree of interest of the second user as a second rating which is higher than the first rating. On the other hand, if the second user gazes at the robot 100, the degree of interest obtaining module 164 may obtain the degree of interest of the second user as a third rating which is higher than the second rating. In addition, the degree of interest obtaining module 164 may obtain the degree of interest of the user based on an angle at which the user gazes at the robot 100.

In still another example, the degree of interest obtaining module 164 may obtain the degree of interest of the user based on the movement information of the user. For example, the degree of interest of the first user who is approaching toward the robot 100 may be higher than the degree of interest of the second user who is moving away from the robot 100. In still another example, the degree of interest obtaining module 164 may obtain the degree of interest of the user based on the speech command of the user. For example, the degree of interest of the first user who utters the speech signal for calling the robot 100 may be higher than the degree of interest of the other users.

The degree of interest obtaining module 164 may obtain the degree of interest of the user based on the information on user density. As described above, the information on user density may include whether a user who is in vicinity of the robot is present, and the density weight values that are calculated according to the distance and the like of the users who are in vicinity of the robot. For example, the first user and the second user who are positioned at a same distance from the robot 100 may be present, and a third user and a fourth user may be present in vicinity of the first user. At this time, the degree of interest obtaining module 164 may reflect the density weight value for the first user and obtain the degree of interest of the first user that is higher than the degree of interest of the second user.

The degree of interest of the user obtained through the degree of interest obtaining module 164 may be included in the fusion map and stored in the memory 140. Then, if the degree of interest of the respective users are obtained, the interaction control module 166 may identify a user with a highest degree of interest from among the plurality of users, and perform an operation for performing an interaction with the identified user. In an example, the interaction control module 166 may approach the identified user and perform an operation for performing a dialogue with the identified user.

The robot of the related art did not take into consideration, when obtaining the degree of interest of the user, the information on user density. Accordingly, even if there is a user crowd with a high density, a user who is closest in distance with the robot or a user with a long gazing time of the robot was identified as the interaction target. For example, it may be assumed that the first user, the third user, and the fourth user are spaced apart from the robot by a first distance and are concentrated forming a crowd, and the second user is positioned spaced apart by a second distance which is shorter than the first distance. In this case, the robot of the related art identified the second user as the interaction target because the second user is positioned closest from the robot. Accordingly, because the first user, the third user, and the fourth user are simultaneously excluded from being the interaction target despite being able to receive service from the robot, there has been the problem of service usefulness decreasing. On the other hand, because the robot 100 according to the disclosure obtains the degree of interest of the user based on the information on user density, in a situation such as the above, one from among the first user, the third user, and the fourth user may be identified as the interaction target. Accordingly, because more number of users are able to receive service, the service usefulness may be increased.

While the interaction control module 166 performs the operation for performing an interaction with the identified user, the engagement level obtaining module 165 may obtain an engagement level of the identified user. Here, the engagement level may refer to a level of which the user engages in with respect to an interaction performed by the robot 100. The engagement level obtaining module 165 may obtain the engagement level of the user based on at least one from among the gazing information of the user and the distance information on the user. In an example, if the first user who is interacting with the robot 100 does not gaze at the robot 100, the engagement level obtaining module 165 may obtain the engagement level of the first user as a first level. On the other hand, if the first user who is interacting with the robot 100 gazes at the robot 100, the engagement level obtaining module 165 may obtain the engagement level of the first user as a second level which is higher than the first level.

If the engagement level of the user is obtained, the interaction control module 166 may control an interaction based on the engagement level of the user. In an example, if the engagement level of the first user is less than a threshold value, the interaction control module 166 may end the interaction with the first user. On the other hand, if the engagement level of the first user is greater than the threshold value, the interaction control module 166 may maintain the interaction with the first user.

The robot of the related art did not collect the degree of interest of other objects present in vicinity of the robot while performing an interaction with the interaction target. On the other hand, the degree of interest obtaining module 164 according to the disclosure may obtain the degree of interest of other users in vicinity of the robot 100 even while the robot 100 is performing an interaction. Accordingly, the robot 100 may perform a more natural interaction compared to the robot of the related art. For example, it may be assumed that the second user has a degree of interest greater than or equal to the pre-set value with respect to the robot while the robot is dialoguing with the first user. Because the robot of the related art cannot obtain the degree of interest of the second user, when the engagement level of the first user becomes less than the threshold value, the robot may move to a pre-set location after ending the dialogue with the first user. Accordingly, the second user had to move to the pre-set location to dialogue with the robot. On the other hand, because the degree of interest obtaining module 164 according to the disclosure can obtain the degree of interest of the second user, if the engagement level of the first user becomes less than the threshold value, the interaction control module 166 may end the dialogue with the first user and perform an operation for performing a dialogue with the second user. Accordingly, the satisfaction and convenience of the second user may be improved.

Referring to FIG. 2, although respective modules 161 to 166 have been described as a configuration of the processor 160, this is merely one embodiment of the disclosure, and the respective modules 161 to 166 may be stored in the memory 140. At this time, the processor 160 may execute respective functions of the plurality of modules 161 to 166 by loading the plurality of modules 161 to 166 stored in the memory 140 from the non-volatile memory to the volatile memory. In addition, the respective modules of the processor 160 may be implemented with software, or implemented in a software and hardware combined form.

Figure 3A:
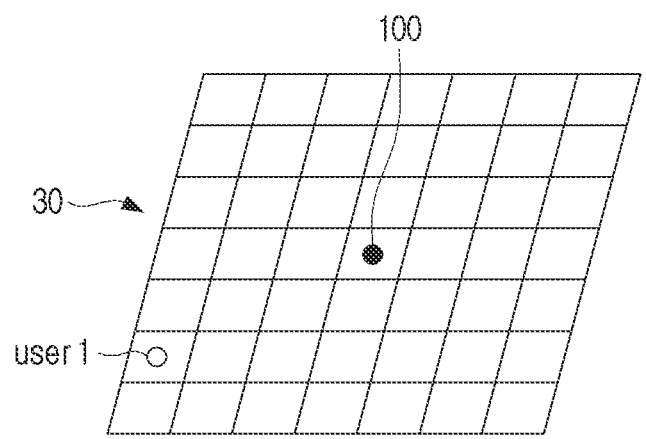
FIG. 3A is a diagram illustrating a map according to an embodiment of the disclosure.
Figure 3B:
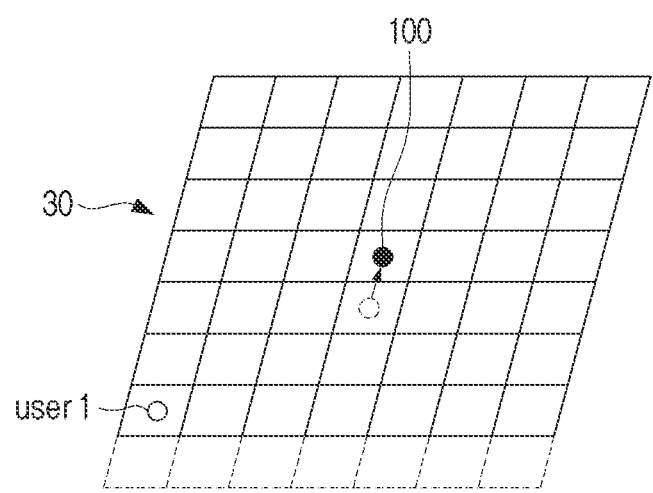
FIG. 3B is a diagram illustrating a map according to an embodiment of the disclosure.
Figure 3C:
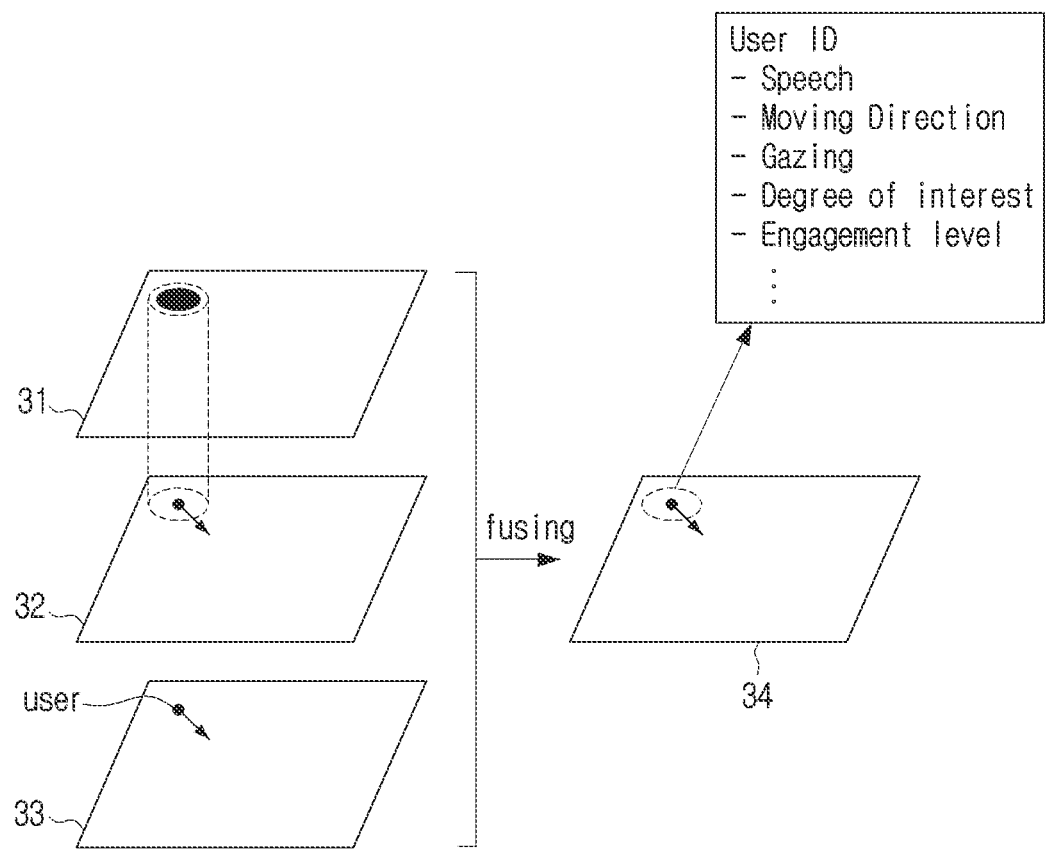
FIG. 3C is a diagram illustrating a fusion map according to an embodiment of the disclosure.

FIGS. 3A, 3B, and 3C are diagrams illustrating information on a user being stored in a memory according to various embodiments of the disclosure.

Referring FIGS. 3A and 3B, they illustrate a map according to various embodiments of the disclosure. A map 30 is represented based on the robot 100, and may include information on an object present in vicinity of the robot 100. For example, the map 30 may include gazing information of the first user (user 1). The map 30 may be stored in a ring buffer of the memory 140. At this time, the position of the robot 100 may correspond to a center of the ring buffer. If the robot 100 moves or rotates, a relative position that corresponds to information included in the map 30 may change. For example, if the robot 100 moved straight forward, as shown in FIGS. 3A and 3B, the position in the map 30 of the first user (user 1) may change. In addition, respective coordinates corresponding to a start and an end of the map 30 may be changed.

The map 30 according to the disclosure may not include information on a whole space in which the robot 100 is present, but include only information on a pre-set range based on the robot 100. Accordingly, information on an area outside the pre-set range according to a movement of the robot 100 may no longer be included in the map 30, and may not be stored in the memory 140. Accordingly, the robot 100 may effectively manage the memory 140.

FIG. 3C is a diagram illustrating a fusion map according to an embodiment of the disclosure. The robot 100 may obtain a plurality of maps that include various information on the user.

Referring to FIG. 3C, the robot 100 may obtain a first map 31 that includes speech information of the user obtained through the microphone 130, a second map 32 that includes movement information of the user obtained through the depth sensor 120, and a third map 33 that includes gazing information of the user obtained through the camera 110. In addition to the above, the robot 100 may obtain a map that includes various information on the user. For example, the robot 100 may include tracking information on the user or movement speed information of the user. The respective maps may correspond to the respective sensors included in the robot 100.

The robot 100 may obtain a fusion map 34 based on the obtained maps. For example, the robot 100 may generate a fusion map 34 by fusing the first map 31, the second map 32, and the third map 33. The robot 100 may match the information included in the respective maps with one another and store the matched information in a form of the fusion map 34. In addition, the fusion map 34 may include information on a user obtained based on the respective maps. In an example, the fusion map 34 may include the degree of interest or the engagement level of the user obtained based on the first map 31, the second map 32, and the third map 33. As described above, the fusion map 34 may be configured such that a value according to time is updated, and accumulated and stored in the memory 140. Accordingly, the robot 100 may perform a more natural interaction with the user based on the fusion map 34 stored in the memory 140.

FIG. 4 is a table illustrating a degree of interest of a user according to an embodiment of the disclosure.

Referring to FIG. 4, numbers included in the table 41 represent the degree of interest of the user, and the degree of interest is higher as the number increases. The robot 100 may obtain the degree of interest of the user based on the gazing information and the movement information of the user. For example, the robot 100 may obtain a high degree of interest of the user as the user gazes at the robot 100 more, or as the user approaches toward the robot 100 more. Specifically, if the user moves in a direction away from the robot 100, the robot 100 may obtain the degree of interest as 1 regardless of the gazing information of the user. In addition, if the user does not gaze at the robot 100 and does not move, the robot 100 may obtain the degree of interest as 1. In addition, if the user gazes at the robot 100 but does not move, the robot 100 may obtain the degree of interest as 2. In addition, if the user gazes at the robot 100 and approaches toward the robot 100, the robot 100 may obtain the degree of interest as 3.

The robot 100 may calculate the degree of interest of the user by reflecting time in which the user gazes at the robot 100. In an example, the robot 100 may obtain a first value as the degree of interest of the user if the time in which the user gazes at the robot 100 is greater than a pre-set time, and obtain a second value that is less than the first value if the time in which the user gazes at the robot 100 is less than the pre-set time.

Referring to FIG. 4, an example of obtaining the degree of interest based on the gazing information and the movement information of the user has been described, but is not limited thereto, and the robot 100 may obtain the degree of interest based on the various information on the user. For example, the robot 100 may obtain the degree of interest based on a distance between the user and the robot 100. Specifically, if the distance between the user and the robot 100 is greater than a first distance (e.g., 2.5 m), the robot 100 may obtain the degree of interest of the user as 1. On the other hand, if the distance between the user and the robot 100 is greater than a second distance (e.g., 1.3 m) which is shorter than the first distance, the robot 100 may obtain the degree of interest as shown in FIG. 4.

In addition, if the distance between the user and the robot 100 is within a third distance (e.g., 1.3 m) for a pre-set time (e.g., 1 second) or more, the robot 100 may obtain the degree of interest as 4. On the other hand, if the distance between the user and the robot 100 is within the third distance (e.g., 1.3 m) for a pre-set time (e.g., 1 second) or less, the robot 100 may obtain the degree of interest as 3. In addition to the above, the robot 100 may obtain the degree of interest based on a position of the user obtained based on the sensing value of the depth sensor 120. In an example, if the user is positioned at an opposite direction from the direction viewed by the robot 100, the robot 100 may obtain the degree of interest as 1.

Figure 5:
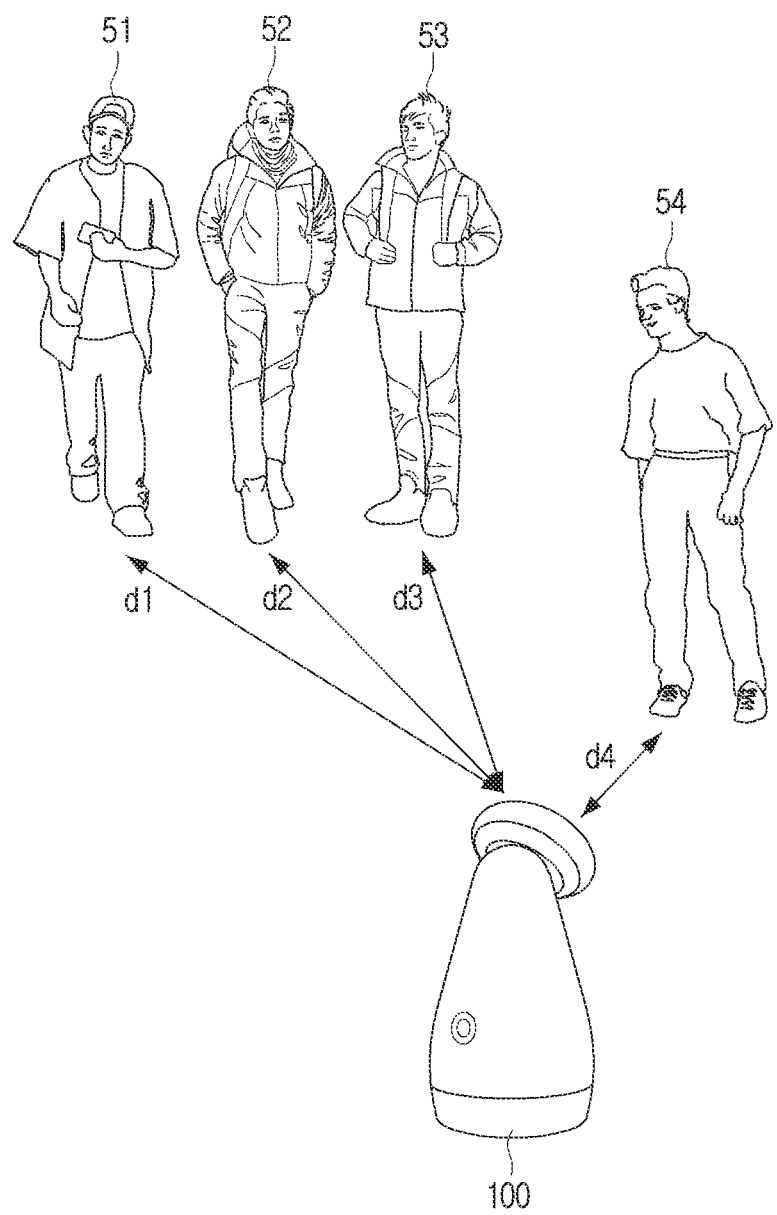
FIG. 5 is a diagram illustrating a method of obtaining a degree of interest according to an embodiment of the disclosure.

FIG. 5 is a diagram illustrating a method of obtaining a degree of interest according to an embodiment of the disclosure.

Referring to FIG. 5, a first user 51, a second user 52, a third user 53, and a fourth user 54 that gaze at the robot 100 may be present at the vicinity of the robot 100. In addition, a fourth distance d4 from the robot 100 to the fourth user 54 may be the shortest from among distances d1, d2, d3, and d4 from the robot 100 to the respective users.

In this situation, the robot of the related art identified the fourth user 54 as the interaction target because the fourth user 54 is most closest to the robot. Accordingly, despite the first user 51, the second user 52, and the third user 53 being concentrated while simultaneously being able to receive service from the robot 100, there is the problem of service usefulness decreasing as the fourth user 54 is identified as the interaction target.

On the other hand, the robot 100 according to the disclosure may obtain the degree of interest of the user based on the information on user density. For example, the robot 100 may identify that the first user 51 and the second user 52 are adjacent to the third user 53 based on the image and the sensing value of the depth sensor 120, and reflect the weight values that reflected density when calculating the degree of interest of the third user 53. Accordingly, even if the third user 53 is farther apart from the robot 100 than the fourth user 54, the robot 100 may identify the third user 53 as the interaction target. If the robot 100 provides service to the third user 53, because the first user 51 and the second user 52 may also receive service together therewith in some cases, service usefulness of be increased.

FIG. 6 is a table illustrating an engagement level of a user according to an embodiment of the disclosure.

Referring to FIG. 6, I numbers included in the table 61 may represent the engagement level of the user for an interaction, and the engagement level may be high as the number increases. As described above, the robot 100 may obtain the engagement level of the user while performing an interaction with the user. At this time, the robot 100 may obtain the engagement level of the user by using the various information on the user. For example, the robot 100 may obtain the engagement level based on the distance from the robot 100 to the user (hereinafter, referred to as 'distance of user') and the gazing information of the user.

Specifically, if the distance of user is less than or equal to a first distance (e.g., 1.3 m), the robot 100 may obtain the engagement level as 5. In addition, if the distance of user is greater than the first distance (e.g., 1.3 m) and less than or equal to a second distance (e.g., 2.5 m) and the user is gazing at the robot 100, the robot 100 may obtain the engagement level as 4. In addition, if the distance of user is greater than the first distance (e.g., 1.3 m) and less than or equal to the second distance (e.g., 2.5 m) and the user is not gazing at the robot 100, the robot 100 may obtain the engagement level as 3. In addition, if the distance of user is greater than the second distance (e.g., 2.5 m) and less than or equal to a third distance (e.g., 3.5 m), the robot 100 may obtain the engagement level as 2. In addition, if the distance of user is greater than the third distance (e.g., 3.5 m), the robot 100 may obtain the engagement level as 1. Referring to FIG. 6, an example of the robot 100 obtaining the engagement level based on the distance of user and the gazing information has been provided, but the embodiment is not limited thereto, and the robot 100 may obtain the engagement level based on various information on the user.

The robot 100 may obtain and store the degree of interest for the robot 100 of other users even while obtaining the engagement level of the user. Accordingly, if the engagement level of the user who is interacting becomes less than a threshold value, the robot 100 may perform an interaction with at least one from among the other users based on the degree of interest for the robot 100 of the other users. For example, in FIG. 1, if the engagement level of the first user 11 is less than the threshold value, the robot 100 may stop the interaction with the first user 11, and perform an interaction with the second user 12 based on the degree of interest of the second user 12. At this time, the robot 100 may identify that the second user 12 had an interest in the robot 100 from an initial interaction step with the first user 11 based on information on the second user 12 stored in the fusion map form. Accordingly, the robot 100 may perform an interaction with the second user 12 (i.e., guiding to the bathroom) bypassing the operation (e.g., greeting) performed at the initial operation step with the first user 11.

In addition, if the degree of interest for the robot 100 of another user is greater than or equal to the pre-set value while the robot 100 is performing the interaction with the user, the robot 100 may provide a guide message to the another user. For example, in FIG. 1, the robot 100 may provide a guide message (e.g., "Please wait shortly while service is being provided to another user.") to the second user 12 while performing the interaction with the first user 11.

Figure 7:
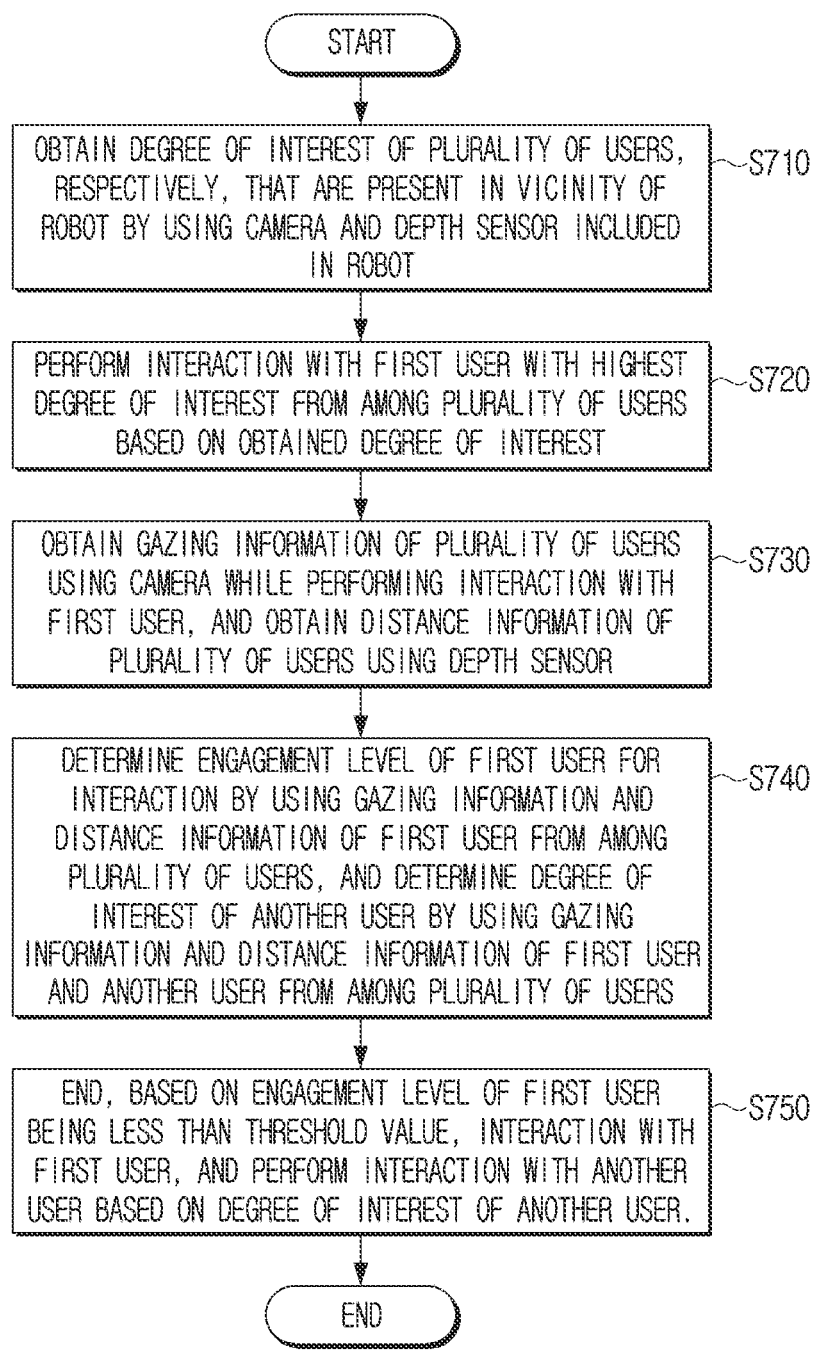
FIG. 7 is a flowchart illustrating a control method of a robot according to an embodiment of the disclosure.

FIG. 7 is a flowchart illustrating a control method of a robot according to an embodiment of the disclosure.

Referring to FIG. 7, the robot 100 may obtain the degree of interest of the plurality of users, respectively, that are present in vicinity of the robot by using the camera and the depth sensor included in the robot 100 at operation S710. The robot 100 may obtain the gazing information of the user by analyzing the captured image obtained using the camera 110, and obtain the distance information and the movement information of the user using the sensing value of the depth sensor 120. In addition, the robot 100 may obtain the information on user density based on the captured image and the distance information. Then, the robot 100 may obtain the degree of interest of the user based on at least one from among the gazing information, the distance information, the movement information, the information on density of the user. Because a more detailed description has been described above, the description will be omitted.

The robot 100 may perform an interaction with the first user with highest degree of interest from among the plurality of users based on the obtained degree of interest at operation S720. The robot 100 may obtain the gazing information of the plurality of users using the camera 110 while performing the interaction with the first user, and obtain the distance information of plurality of users using the depth sensor 120 at operation S730. The robot 100 may store the gazing information and the distance information of the plurality of users in map form in the memory. Then, the robot 100 may generate a fusion map based on the map corresponding to the respective information. In an example, the robot 100 may generate a fusion map by fusing the first map that corresponds to the gazing information of the respective users and the second map that corresponds to the distance information and store in the memory.

The robot 100 may determine the engagement level of the first user for the interaction by using the gazing information and the distance information of the first user from among the plurality of users, and the determine degree of interest of the another user by using the gazing information and the distance information of first user and the another user from among the plurality of users at operation S740. The robot 100 may end, based on the engagement level of the first user being less than the threshold value, the interaction with the first user, and perform an interaction with the another user based on the degree of interest of the another user at operation S750. Because the interaction operation of the robot 100 has been described above, the detailed description will be omitted.

The various embodiments described above may be implemented in a recordable medium which is readable by a computer or a device similar to the computer using software, hardware, or the combination of software and hardware. In some cases, the embodiments described herein may be implemented by the processor itself. According to a software implementation, embodiments such as the procedures and functions described herein may be implemented with separate software modules. The respective software modules may perform one or more of the functions and operations described herein.

The computer instructions for performing processing operations according to the various embodiments described above may be stored in a non-transitory computer-readable medium. The computer instructions stored in this non-transitory computer-readable medium may cause a specific device to perform the processing operations according to the above-described various embodiments when executed by the processor.

The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a universal serial bus (USB), a memory card, a read only memory (ROM), and the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A robot comprising:
    a camera;
    a depth sensor;
    a memory; and
    at least one processor,
    wherein the at least one processor is configured to:
        perform an interaction with a first user with a highest degree of interest from among a plurality of users present in vicinity of the robot by using the camera and the depth sensor,
        obtain gazing information of the plurality of users by using the camera while performing the interaction with the first user, and obtain distance information of the plurality of users by using the depth sensor,
        determine an engagement level of the first user for the interaction by using the gazing information and the distance information of the first user from among the plurality of users, and determine a degree of interest of another user by using gazing information and distance information of the other user from among the plurality of users,
        match information on the other user and the degree of interest of the other user for each time interval with time information and store the matched information, and
        end, based on the engagement level of the first user being less than a threshold value, the interaction with first user, and provide a service, same as a service provided to the first user, to the other user based on the matched information.

2. The robot of claim 1, wherein the at least one processor is further configured to:
    store, while performing the interaction with the first user, a first map comprising gazing information of the plurality of users, respectively, and a second map comprising distance information of the respective users in the memory,
    generate a fusion map by fusing the first map and the second map, and store the fusion map in the memory, and
    perform an interaction with the other user based on the fusion map.

3. The robot of claim 2, wherein the at least one processor is further configured to:
    accumulate the fusion map for each of respective times and store in the memory, and
    delete the first map and the second map from the memory according to time.

4. The robot of claim 1, wherein the at least one processor is further configured to:
    obtain an image comprising the plurality of users by using the camera,
    obtain gazing information of the plurality of users by analyzing the image,
    obtain distance information of the plurality of users by using the depth sensor,
    obtain density information of the plurality of users based on the distance information of the plurality of users, calculate a degree of interest of the plurality of users, respectively, based on the gazing information, the density information, and the distance information of the plurality of users, and identify the first user with the highest degree of interest from among the plurality of users based on the degree of interest of the respective users.

5. The robot of claim 4,
wherein the density information comprises density weight values that corresponds to the respective users, and
wherein the at least one processor is further configured to:
calculate a first density weight value that corresponds to the first user based on at least one from among a distance between the first user and the other user and a number of other users comprised within a pre-set range from the first user, and
calculate the degree of interest of the first user based on the first density weight value.

6. The robot of claim 5, wherein the processor is further configured to calculate a high degree of interest of the first user as the first density weight value is greater.

7. The robot of claim 1, wherein the at least one processor is further configured to:
obtain time information that corresponds to the degree of interest of the respective users and store in the memory, and
identify, based on the time information, another user with a degree of interest of greater than or equal to a threshold value within a pre-set range from a time point at which the interaction with the first user is ended as an interaction target.

8. The robot of claim 1, further comprising:
a microphone,
wherein the at least one processor is further configured to:
obtain a speech signal by using the microphone,
identify a user corresponding to the speech signal from among the plurality of users, and
calculate the degree of interest of the identified user based on the speech signal.

9. A method of controlling a robot, the method comprising:
obtaining a degree of interest of a plurality of users, respectively, that are present in vicinity of the robot by using a camera and a depth sensor comprised in the robot;
performing an interaction with a first user with a highest degree of interest from among the plurality of users based on the obtained degree of interest;
obtaining gazing information of the plurality of users by using the camera while performing the interaction with the first user, and obtaining distance information of the plurality of users by using the depth sensor;
determining an engagement level of the first user for the interaction by using gazing information and distance information of the first user from among the plurality of users, and determining a degree of interest of another user by using gazing information and distance information of the other user from among the plurality of users;
match information on the other user and the degree of interest of the other user for each time interval with time information and store the matched information; and
ending, based on the engagement level of the first user being less than a threshold value, the interaction with first user, and providing a service, same as a service provided to the first user, to the other user based on the matched information.

10. The method of claim 9, further comprising:
storing, while performing the interaction with the first user, a first map comprising gazing information of the plurality of users, respectively, and a second map comprising distance information of the respective users; and
generating a fusion map by fusing the first map and the second map, and storing the fusion map,
wherein the performing an interaction with the other user comprises performing the interaction with the other user based on the fusion map.

11. The method of claim 10,
wherein the fusion map for each of respective times is accumulated and stored, and
wherein the first map and the second map are deleted from a memory according to time.

12. The method of claim 9, wherein the obtaining the degree of interest of the plurality of users, respectively, comprises:
obtaining an image comprising the plurality of users by using the camera;
obtaining gazing information of the plurality of users by analyzing the image;
obtaining distance information of the plurality of users by using the depth sensor;
obtaining density information of the plurality of users based on the distance information of the plurality of users; and
calculating a degree of interest of the plurality of users, respectively, based on the gazing information, the density information, and the distance information of the plurality of users.

13. The method of claim 12,
wherein the density information comprises density weight values that correspond to the respective users, and
wherein the calculating the degree of interest of the respective users comprises:
calculating a first density weight value that corresponds to the first user based on at least one from among a distance between the first user and the other user and a number of other users comprised within a pre-set range from the first user; and
calculating the degree of interest of the first user based on the first density weight value.

14. The method of claim 13, wherein the calculating the degree of interest of the first user comprises calculating a high degree of interest of the first user as high as the first density weight value is greater.

15. The method of claim 12, wherein the obtaining the degree of interest of the plurality of users, respectively, comprises:
obtaining and storing time information that correspond to the degree of interest of the respective users; and
identifying, based on the time information, another user with a degree of interest of greater than or equal to a threshold value within a pre-set range from a time point at which the interaction with the first user is ended as an interaction target.

16. The method of claim 12, wherein the obtaining the degree of interest of the plurality of users, respectively, comprises:
obtaining a speech signal by using a microphone,
identifying a user corresponding to the speech signal from among the plurality of users, and calculating the degree of interest of the identified user based on the speech signal.

17. A non-transitory computer readable recording medium storing computer instructions that cause a robot to perform an operation when executed by a processor of an electronic apparatus, wherein the operation comprises;
   obtaining a degree of interest of a plurality of users, respectively, that are present in vicinity of the robot by using a camera and a depth sensor comprised in the robot;
   performing an interaction with a first user with a highest degree of interest from among the plurality of users based on the obtained degree of interest;
   obtaining gazing information of the plurality of users by using the camera while performing the interaction with the first user, and obtaining distance information of the plurality of users by using the depth sensor;
   determining an engagement level of the first user for the interaction by using gazing information and distance information of the first user from among the plurality of users, and determining a degree of interest of another user by using gazing information and distance information of the other user from among the plurality of users;
   match information on the other user and the degree of interest of the other user for each time interval with time information and store the matched information; and
   ending, based on the engagement level of the first user being less than a threshold value, the interaction with first user, and providing a service, same as a service provided to the first user, to the other user based on the matched information.

18. The non-transitory computer readable recording medium of claim 17, wherein the operation further comprises:
   storing, while performing the interaction with the first user, a first map comprising gazing information of the plurality of users, respectively, and a second map comprising distance information of the respective users; and
   generating a fusion map by fusing the first map and the second map, and storing the fusion map,
   wherein the performing an interaction with the other user comprises performing the interaction with the other user based on the fusion map.

19. The non-transitory computer readable recording medium of claim 18,
   wherein the fusion map for each of respective times is accumulated and stored, and
   wherein the first map and the second map are deleted from a memory according to time.

20. The non-transitory computer readable recording medium of claim 17, wherein the obtaining the degree of interest of the plurality of users, respectively, comprises:
   obtaining an image comprising the plurality of users by using the camera;
   obtaining gazing information of the plurality of users by analyzing the image;
   obtaining distance information of the plurality of users by using the depth sensor;
   obtaining density information of the plurality of users based on the distance information of the plurality of users; and
   calculating a degree of interest of the plurality of users, respectively, based on the gazing information, the density information, and the distance information of the plurality of users.

21. The robot of claim 4, wherein the at least one processor is further configured to:
   analyze the obtained image; and
   obtain gesture information of a user of the plurality of users based on the analysis of the obtained image.

22. The robot of claim 21, wherein the obtained gesture information includes a gesture of the user calling the robot.

23. The robot of claim 5, wherein the processor is further configured to:
   calculate a first degree of interest of the first user and a second degree of interest of the other user,
   wherein a first density weight value of the first user is greater than a second density weight value of the other user,
   wherein a distance from the first user to the robot is greater than a distance from the other user to the robot, and
   wherein the first degree of interest of the first user is greater than the second degree of interest of the other user.

* * * * *